Aug. 26, 1958 L. W. PARKER 2,849,529

TUNING SYSTEM FOR TELEVISION RECEIVERS

Filed Aug. 30, 1952 3 Sheets-Sheet 1

INVENTOR
Louis W. Parker.
BY
Moore and Hall
ATTORNEYS

TUNING SYSTEM FOR TELEVISION RECEIVERS

Filed Aug. 30, 1952 3 Sheets-Sheet 2

INVENTOR
LOUIS W. PARKER
BY
Moore and Hall
ATTORNEYS

Aug. 26, 1958 L. W. PARKER 2,849,529

TUNING SYSTEM FOR TELEVISION RECEIVERS

Filed Aug. 30, 1952 3 Sheets-Sheet 3

INVENTOR
LOUIS W. PARKER

BY Moore and Hall

ATTORNEYS

United States Patent Office
2,849,529
Patented Aug. 26, 1958

2,849,529

TUNING SYSTEM FOR TELEVISION RECEIVERS

Louis W. Parker, Great Neck, N. Y.

Application August 30, 1952, Serial No. 307,222
10 Claims. (Cl. 178—5.8)

This invention relates to a tuning system for television receivers, and other types of radio receivers used for the simultaneous reception of two radio signals. This condition is found mainly in television receivers, where the picture and sound signals are received simultaneously. This present application is the continuation in part of my previous patent application having the Serial Number 161,279, filed April 4, 1950, entitled Tuning System for Radio and Television Systems, now U. S. Patent 2,773,119, issued December 4, 1956.

The invention is particularly advantageous for television receivers which employ the intercarrier circuit. This circuit, which is disclosed in the present inventer's Patent No. 2,448,908, preferably employs a superheterodyne circuit having a single I. F. amplifier for both the AM video carrier and the FM audio carrier, the output of the second detector including a beat frequency produced by the carriers, that is frequency modulated by the audio signals. This beat frequency passes through a selector and limiter to the usual discriminator, amplifier and loud speaker circuits for the audio signals.

The acceptance of the I. F. amplifier in this circuit is made sufficiently broad, in order to pass the video and audio bands, so that when the receiver is tuned to a station the tuning may be varied considerably without changing the volume from the loud speaker; and accurate tuning therefore depends on observation of the picture quality. This arrangement is subject to certain drawbacks. It is difficult to detect poor picture quality when certain types of pictures are received; too much dependence is placed on the operator's judgment and care, which are subject to wide individual variations; and picture quality is not sharply peaked, but varies gradually in the neighborhood of correct tuning, requiring care and close attention to get the best results.

The same problem is present in the tuned radio frequency type of intercarrier television receivers, since the acceptance of the T. R. F. circuit must be broad enough to pass both carriers.

A general object of the invention is to provide a novel tuning system for television receivers that is not dependent on observation of picture changes, and which has a sharply peaked response to tuning. One purpose is to provide such a tuning system that is adapted to operate in substantially the same manner as standard radio tuning systems, so that prospective television receiver purchasers will not be deterred by strange tuning devices. The invention facilitates the practical and effective use of continuous tuning arrangements having control knobs similar in appearance and operation to those on radio receivers.

Another purpose is to provide an improved tuning system for television receivers employing the intercarrier system which will operate with greater speed, accuracy and convenience.

More specific objects are to furnish a visual indication of correct picture tuning, such as a tube of the "tuning eye" type; an audible indication by producing a sharp peak of sound volume when tuning is correct; and a combination of these two types of indicators.

Another purpose is to provide a circuit which permits an amplifier tube while functioning normally on one band of frequencies, to be used as a cathode follower on another band of frequencies, the two functions being carried out without interference.

A further important object is to furnish in addition to a tuning indicator system that is relatively simple and inexpensive, one which can hold the sound volume down on undesired interchannel noises. These noises are especially disturbing on continuously tuned television receivers.

These and other objects and advantages will appear from the following description of a preferred embodiment of the invention, in conjunction with the accompanying drawings, in which.

Figure 1:
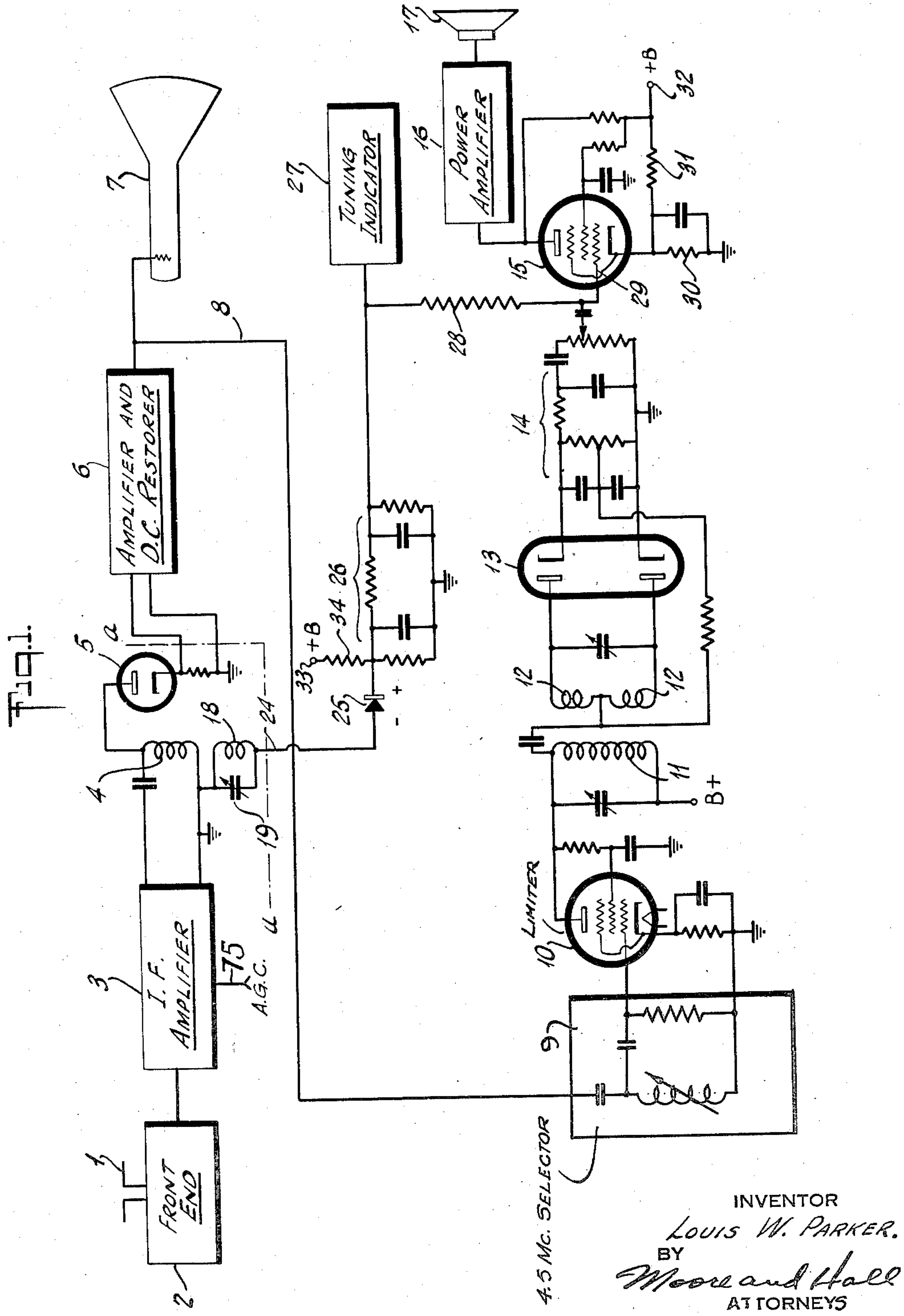
Fig. 1 is a diagram of a television receiver circuit employing the intercarrier system, with superheterodyne amplification, and embodying the invention, including an inductively coupled indicator circuit.
Figure 2:
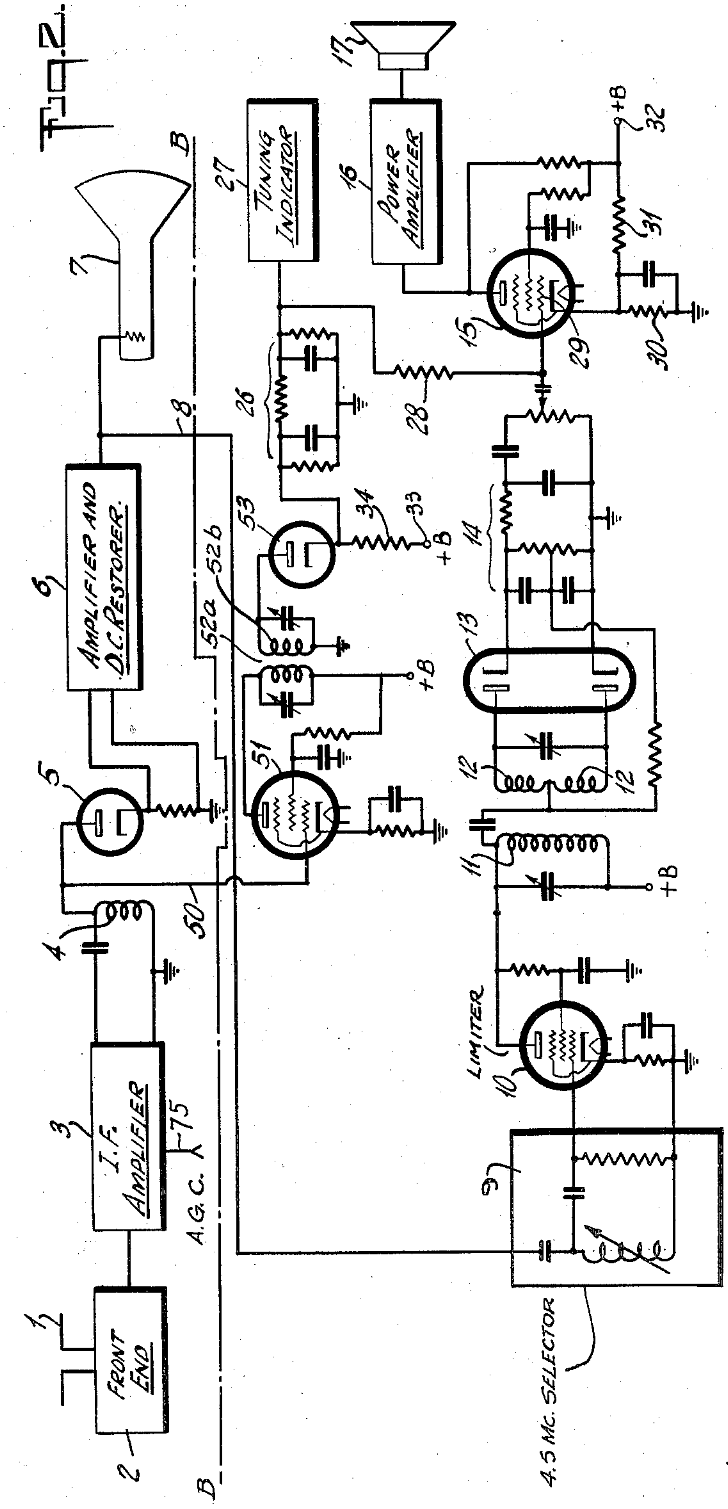
Fig. 2 is a similar diagram, showing buffer amplifier coupling of the indicator circuit.

The invention is illustrated in Figs. 1 and 2 by its use in a television receiver of the superheterodyne type employing the intercarrier circuit. Since this circuit is well known and has been extensively described, in publications, only the portions pertinent to this invention are shown in detail.

In the form illustrated in Fig. 1 the incoming signals picked up by antenna 1 pass through the conventional front end 2 of a television receiver, having the usual tuning controls. While the invention will work with any conventional front end, its use is most advantageous with continuously tuned front ends. From the front end the signals are passed to the I. F. amplifier 3, which transmits them through a coupling system including coil 4 to video detector 5, from which they pass through video amplifier and D. C. restorer 6 to picture tube 7. The FM audio signals, carried by the beat frequency, are taken off by lead 8 and pass through selector 9 and limiter pentode 10, discriminator input coil 11, output coils 12, rectifier 13, filter 14, amplifier tube 15 and power amplifier 16 to loud speaker 17, in accordance with well known practice.

At the input end of the indicator circuit is a coil 18 coupled to an inductance in the I. F. amplifier, such as output coil 4, and tuned by condenser 19 to a frequency that will produce the maximum pickup by the indicator circuit when the front end 2 is correctly tuned to an incoming picture carrier.

Figure 3:
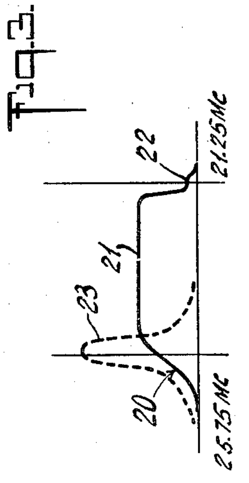
Fig. 3 is a graph of the acceptance curves of the receiver I. F. circuit and of the indicator circuit.

The invention is illustrated in its application to the vestigial side band receiver described in the above mentioned patent. In a receiver of this type, as indicated in Fig. 3, the video carrier intermediate frequency is located at about the midpoint of the slope 20 at the high frequency end of the acceptance curve 21 of the I. F. amplifier at its output end, the amplifier being designed to provide maximum amplification for the lower side band. At its other end curve 21 drops sharply to the audio carrier frequency 22, described in said patent. Under the system now in force in the United States the audio and video carrier frequencies are spaced by 4.5 mc.; and in the embodiment illustrated, the audio intermediate frequency is 21.25 mc. and the video intermediate frequency is 25.75 mc.

The circuit 18—19 is tuned to substantially the correct video I. F. carrier frequency, and its acceptance curve is sharply peaked, especially since coils 4 and 18 are advantageously coupled so that a minimum of energy is extracted from the main circuit by the indicator circuit. This coupling must be loose enough so that it does not appreciably affect the selectivity curve. It has been found that for greatest tuning precision with the illustrated side band system, the indicator input circuit 18—19 should be tuned to a frequency very slightly below the correct video intermediate frequency, the difference being only of the order of 0.1 mc. under standard conditions. This precise tuning setting can best be obtained empirically, as by tuning variable condenser 19, adjusting it for maximum input into the indicator circuit when the correct video carrier frequency is passed through the I. F. amplifier. However, this is a tuning refinement that is not absolutely necessary to satisfactory operation, and is intended to be included in the description of input circuit 18—19 as substantially tuned to the video intermediate carrier frequency.

Coil 18 is connected by lead 24 to the negative side of rectifier 25, which may be a crystal or other suitable type. The rectifier output passes through a filtering and attenuating network 26 to tuning indicator 27. This may be a tube of the well known "tuning eye" type, such as tube type 1629, in a suitable circuit. This type of tube has a visible target with a luminous arc varied in extent by changes in tuning, and for convenience will be referred to herein as a tuning eye tube. It should be noted, however, that in the present instance, since positive control potential is supplied to the tube, it will operate in reverse, with the maximum gap between the ends of the luminous arc when tuning is correct. The rectified output will not vary with picture content, since the rectifier operates only on synchronizing signal peaks.

The output of network 26 is also applied through resistor 28 to the control grid 29 of audio amplifier tube 15. This grid is biased, relative to the cathode, to a negative bias substantially more negative than the correct value for optimum amplification, resulting in a low level of sound output and weak signals from loud speaker 17. This bias may be produced in various ways. In the form illustrated, a cathode biasing resistor 30 is used but in addition to the usual cathode current, some additional current is passed through resistor 30 by connecting the cathode through resistor 31 to a positive potential source, which advantageously is the usual plate potential source 32.

The bias potential of grid 29 is selected so that, when the maximum current flows in the indicator circuit, the resulting positive potential applied by the latter circuit to grid 29 will raise the grid potential to the correct value for optimum audio amplification. Although in the illustrated embodiment the fixed grid bias, and the variable grid bias from the indicator circuit, are shown as applied to the same grid of the tube 15, which has only one operative control grid, the invention in its broader aspects is not limited to this arrangement or to the type of tube shown, since similar results can be obtained by utilizing multiple control grids of a suitable tube, such as type 6L7.

The indicator circuit includes an arrangement which maintains the sound volume at a steady level during tuning. In the form shown, this arrangement applies to the output of rectifier 25 a D. C. potential whose value is higher than that produced by undesirable sound signals, such as noises, but of course substantially lower than the channel tuning peaks 23. This procedure is sometimes described as introducing a delay factor; but it should be understood that the term does not refer to a time delay in such cases. In the illustrated circuit the result is obtained by connecting the output of rectifier 25 to a source of positive potential 33, which may be the plate potential source connected through a suitable dropping resistor 34.

The operation of the system as thus far described is as follows: When the receiver is being tuned to the frequency of a desired channel the indicator circuit is not affected until the front end 2 is tuned sufficiently close to the correct setting so that the incoming signals are carried by an intermediate frequency within the pass band of amplifier 3, a picture of some type appears on the screen of tube 7, and sound is heard from speaker 17. Tuning indicator 27 may indicate reception of such signals; but owing to the peaked characteristic 23 of the indicator circuit, the D. C. voltage applied to indicator 27 and grid 31 will be so low that neither the visual indication nor the sound volume will be materially affected until the tuning approaches closely to the correct value. Upon such approach the sound volume will rise sharply, the width of the dark gap in the tuning eye tube will change noticeably, and when tuning is precisely correct, slight changes in either direction will cause a noticeable drop in sound volume and a substantial change in the appearance of the indicator 27. The operator will therefore tune to a well-defined peak of sound, to a definite indicator position, or to both, without the necessity of judging picture quality.

This type of operation can be obtained with tuning controls of any desired type devoted solely to tuning the front end to the correct wave length, and eliminates the need for special types of tuning heretofore used in television receivers. It is pointed out that with this system the tuning affects the volume of sound, not its quality, which is harder to judge.

It should also be noted that, while the sides of curve 23 are steep, it will be sufficiently broad at the top to permit the oscillator-generated frequency in the front end 2 to drift considerably without producing any noticeable change in the sound or the picture. Such a drift generally occurs as the set warms up; and the width of the top of curve 23 between the steep sides is sufficient to eliminate the need for returning after initially tuning to the right setting.

While both a visual indicator 27 and a sound volume varying arrangement are shown, and can be used in combination as in many radio receivers, it will be evident that either type of tuning indication may be used alone, either by omitting the indicator 27 or by eliminating the connections through resistors 28 and 31 to tube 15.

It may be desirable in some cases to avoid the effects of inductive coupling of the indicator circuit on the main circuit, as shown in Fig. 1; for this reason a similar circuit, using conductive coupling and a buffer tube, is illustrated in Fig. 2. The circuit is largely the same as the one previously described, and corresponding parts are indicated by the same numerals. In this embodiment lead 50 is connected to the output of amplifier 3. The other end of lead 50 is connected to the control grid of buffer tube 51, whose output is fed through a tuned circuit transformer to the indicator circuit rectifier. In the illustration the transformer comprises two tuned sections **52*a* and 52*b* both tuned to the video carrier intermediate frequency in amplifier 3**.

It will be noted that the rectifier in Fig. 2 is shown as a diode; but this is done simply to illustrate the fact that different rectifiers can be used in both Fig. 1 and Fig. 2, whose requirements are the same.

The operation of the Fig. 2 circuit is substantially the same as that previously given for Fig. 1. Since lead 50 draws no current, this arrangement does not affect the operation of the main television circuit.

Figure 4:
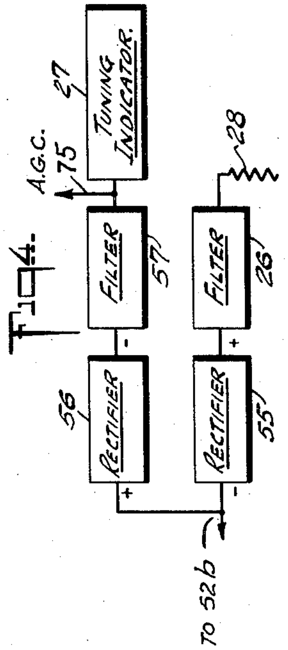
Fig. 4 is a diagram of a modification of the indicator circuit.

It has been pointed out that with the circuits heretofore described, when a tuning indicator employing a tuning eye tube is used, it will operate in reverse fashion, since the control potential from the indicator circuit is positive. While this arrangement will operate satisfactorily, there is some advantage in having the tube operate in conventional fashion. This may be accomplished by modifying the control circuit to provide a negative control potential; and one arrangement of this type is illustrated in Fig. 4. It includes separate circuits for the visual indicator 27 and for the sound indicating arrangement including tube 15, both connected to the same coil 52*b*. The sound circuit is the same as that previously described, including rectifier 55, filter 26 and resistor 28, connected as in Figs. 1 and 2. A separate visual indicator circuit is also connected to coil 52*b* and includes a second rectifier 56, connected with its positive side toward coil 52*b* and the input, so that the negative side is connected through filter 57, which may be the same as filter 26, to the visual tuning indicator 27, where it controls the operation of the tuning eye tube in conventional manner.

The same D. C. potential may also be used for automatic gain control of the I. F. amplifier. Lead 75 connected to the output of filter 57 conducts the negative control potential to the I. F. amplifier grids in the conventional manner.

Figure 5:
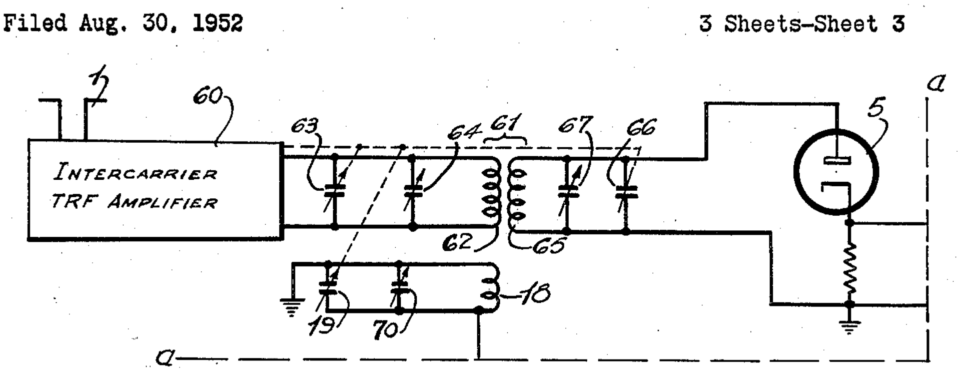
Fig. 5 is a diagram of a modification of the initial portion of the circuit shown in Fig. 1 up to the line *a—a*, illustrating the application of the invention to such a circuit employing tuned radio frequency amplification.

As already indicated, the invention is advantageous for television receivers employing a tuned radio frequency intercarrier amplification section. This embodiment is illustrated in Fig. 5. Parts common to Figs. 1 and 5 are designated by the same numerals, and as the portions of the circuits of these figures following line *a—a* are the same, this portion is not included in Fig. 5.

The circuit of the tuned amplifier 60 is well known, being shown in standard publications and therefore is not illustrated in detail. The last amplifier stage includes the usual output transformer 61, with primary 62 shunted by tuning condenser 63 and trimming condenser 64, and secondary 65 connected to the detector tube 5 and shunted by tuning condenser 66 and trimming condenser 67. All of these condensers are of course variable; and the tuning condensers 63, 66 are ganged with other tuning condensers in amplifier 60 in accordance with standard practice.

The indicator circuit input coil 18 is inductively coupled to primary coil 62, and the variable condenser 19 which tunes coil 18 is ganged with condensers 63 and 66. Coil 18 and condenser 19 are designed and arranged to maintain a substantially uniform difference of 2 megacycles between the frequencies to which coils 62 and 18 are tuned, throughout the tuning range. This is due to the vestigial system of transmission of television signals, which places the picture carrier about 2 mc. away from the middle of the band. It has been found in practice that the frequencies to which these coils are tuned do not vary during tuning at precisely the same rate, so that the frequency difference will vary slightly at different points in the tuning range. It has been found that by adjusting the inductance of coil 18 on the low frequency end of the range the desired difference can be obtained. A similar adjustment is made on trimer condenser 69 on the high frequency end of the range to obtain the same frequency difference. The variations at intermediate frequencies will be negligible.

The operation of this embodiment is apparent from the foregoing description.

For simplicity, only the inductive type of input coupling of the indicator circuit has been shown in Fig. 5; but this showing is not intended to be construed as a limitation to this type of coupling, especially since the conductive type has been illustrated in Fig. 2. It is also evident that the modification shown in Fig. 4 is applicable to Fig. 5.

Figure 6:
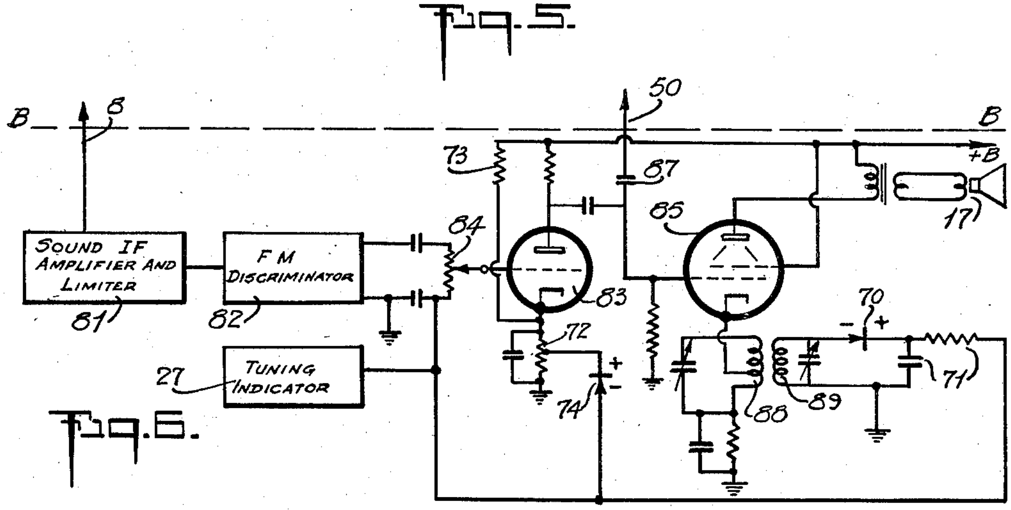
Fig. 6 is a diagram showing the way the tuning system may make use of the two AF amplifiers in the receiver.

Another form of the invention is illustrated on Fig. 6. In this form the buffer amplifier tube 51 of Fig. 2 is eliminated and its function is performed by the last AF amplifier tube.

The circuit components above line B—B are not shown on Fig. 6 inasmuch as these are the same as on Fig. 2 above line B—B. The 4.5 mc. frequency modulated signal is obtained through conductor 8. This is fed to a conventional limiter amplifier 81 and discriminator 82. The demodulated AF voltage is applied to the control grid of amplifier triode 83 through volume control 84. The amplified output of triode 83 drives power amplifier 85 which in turn drives the loud speaker 17. In addition to the usual AF signal applied to the control grid of power amplifier 85, there is also an I. F. signal which is obtained thru small condenser 87 and line 50 from the output of the I. F. amplifier. Due to the high impedance of condenser 87 for audio frequencies and also the low impedance of the I. F. transformer, no appreciable AF signal is fed back to the I. F. amplifier. However, the I. F. signal is effectively applied to the control electrode of amplifier 85. This amplifier 85 has part of a tuned circuit 88 in series with its cathode. The resonance frequency of this tuned circuit 88 is substantially the same as the desired picture carrier I. F. frequency, which in the previous examples was 25.75 mc. Loosely coupled to tuned circuit 88 is another sharply tuned circuit 89 resonating also at the picture carrier I. F. frequency. Amplifier 85 acts as a cathode follower for the I. F. frequency and while drawing no appreciable current from the I. F. amplifier, it permits a considerable drain at this frequency on its cathode circuit. Consequently tuned circuits 88 and 89 are permitted to build up a voltage of 8 or 10 volts. Of course amplifier 85 also functions as an AF power amplifier, at the same time when acting as cathode follower for the I. F. frequencies. Actually the amplitude of these I. F. frequencies is low between grid and cathode. This is due to the fact that the voltage built up across the portion of resonance circuit 88 which is in series with the cathode is in phase opposition to the voltage applied between its grid and ground. In this way only the difference of the two I. F. voltages is actually applied between grid and cathode. This difference may be in the order of 10% of the applied voltage.

The I. F. voltage built up across resonance circuit 89 is rectified by rectifier 70 with such polarity as to create a positive potential with respect to ground. This D. C. potential which may be in the order of 10 volts, is filtered by resistance capacity filter 71 and applied in series with volume control 84. Triode 83 is biased to nearly plate current cut off due to the action of cathode resistor 72. In addition to the normal cathode current thru this resistor 72, there is also a regulated amount of direct current thru resistor 73 from the plate supply. In this way enough cathode bias is built up to make amplifier 83 almost inoperative. In the event a picture I. F. carrier of the correct frequency is applied to the control grid of AF amplifier 85, there will be a voltage built up across resonance circuits 88 and 89, which after having been rectified by rectifier 70 and filtered by filter 71, is applied to the grid of triode 83 in such manner as to overcome the excessive negative bias. In this way the tube is restored to normal operation when tuning is correct, the method serving in this way first to reduce volume when tuning is incorrect and undesirable noises may be present, and second acting as an indicator of correct tuning.

Inasmuch as the usual automatic gain control holds the I. F. voltage level nearly constant on all stations when they are correctly tuned, there is usually no need to make provision for great variations in signal level. However, in exceptional cases the I. F. picture carrier may be so high as to drive the grid of triode 83 into the zero or positive bias region of operation, in which case distortion would result. To eliminate this possibility rectifier 74 is so connected between the rectified D. C. output and a point on the cathode resistor 72, that if this output rises over the potential existing between the chosen point on the cathode resistor and ground, then the rectifier starts conducting and holds the positive bias down by loading its source.

A tuning indicator 27 such as for example the above described tuning eye may also be used. It is operated by the output voltage from filter 71.

Figure 7:
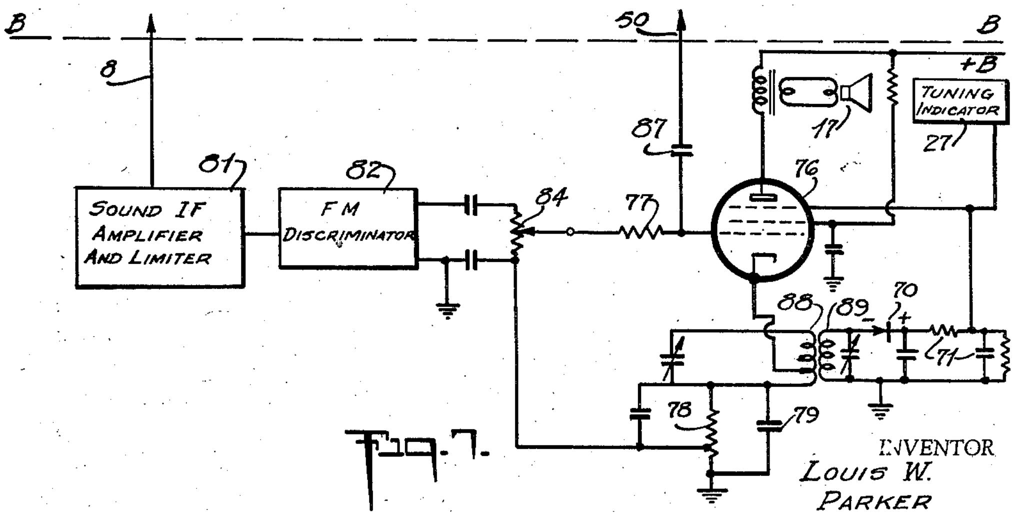
Fig. 7 is similar to Fig. 6 except it uses only one of the AF amplifier tubes.

In some cases the use of one stage of AF amplifier is preferred. To take care of such situation the circuit shown on Fig. 7 may be used.

On this figure the sound I. F. amplifier 81, discriminator 82 as well as the loud speaker in the plate circuit of output pentode 76, functions the same way as in Fig. 6. The AF voltage is fed to the control grid of power pentode 76 thru volume control 84. There is a resistance 77 (in the order of 30,000 ohms) in series with this control grid so as not to load I. F. source 50, which is also connected to this same control grid, thru small condenser 87. Such loading may occur when volume control 84 is in very low volume position. In series with the cathode of pentode 76 is part of resonance circuit 88 and cathode bias resistor 78. Across resistor 78 is high capacity bypass condenser 79. The action of elements 88, 78 and 79 are the same as in Fig. 6. Considerable I. F. voltage is built up across tuned circuit 88, which is transferred by inductive coupling to tuned circuit 89. The voltage across this tuned circuit is rectified and filtered by elements 70 and 71 as was the case in Fig. 6. The positive bias so obtained is applied to the suppressor of pentode 76. The voltage across cathode resistor 78 is so chosen that when it is applied to the suppressor, the plate current is almost cut off. A lesser bias for the first grid is obtained thru a tap on resistor 78.

Due to the high screen current at the time of plate current cut off, the cathode current does not vary greatly with large variations in suppressor bias, consequently the cathode follower action is undisturbed.

The operation of the circuit is the same as in Fig. 6. Incorrect tuning reduces the AF output of pentode 76 by permitting a steady high negative bias to greatly diminish the plate current. Correct tuning counterbalances this by applying a positive bias to the suppressor, bringing back normal volume.

Rectifiers 25, 53, 55, 56 and 70 shown in the foregoing figures as simple diodes may be replaced by tubes with control electrodes. In that case these rectifiers may be keyed by pulses from the horizontal deflection circuit. Such procedure is conventional and it reduces the controlling effect of noise pulses, since the rectifier only operates during 8% of the time. Adding this refinement does not alter any of the principles of the invention.

While a specific embodiment of the invention and certain variations have been described, it will be evident that the invention is not limited to the particular arrangements shown. It can be applied by electronic engineers in the light of this disclosure to a wide variety of circuits, and particularly television circuits, that have been and will be hereafter disclosed. While it has special and unexpected advantages when used with the intercarrier circuit, it includes features that are applicable to other circuits. Although its use with the vestigial side band system has been described, since it conforms to present preferred practice, and is particularly advantageous for this system, the invention in its broader aspects is not limited to such use. Likewise, the invention is not limited to television systems employing FM sound, but will work equally well on AM sound systems.

It is understood that the preferred form of my invention includes all the details described in my said prior Patent 2,448,908, entitled Television Receiver, granted September 7, 1948. Therefore, preferably the response curve of Figure 3 is substantially horizontal throughout a band 22 wide enough to pass the frequency modulated audio signals. The amplitude of video signals 21 passed by I. F. amplifier 3 is about twenty times the amplitude of frequency modulation signals 22. When the picture carrier and the audio carrier pass through detector 5, there is a heterodyning action whereby a carrier at 4.5 megacycles appears which is frequency modulated according to the audio signals.

It is understood that the broader aspects of my invention are not limited to the details disclosed. For example instead of employing a rectifier and a tuning eye in the output of the tuned circuit I could use any other means for indicating the amplitude of radio frequency currents. However, the preferred details disclose improvements which are claimed specifically. The specific disclosure is not intended to limit the invention to the particular features described, except as indicated in the claims.

I claim:

1. In a radio receiver for receiving a band of frequencies and including tuning means for varying the frequency of reception, said receiver including a detector and means for amplifying the output of said detector, said amplifying means including all of the following parts: an electron discharge device having a cathode, first, second and third grids and an anode, means for feeding energy from said detector to the first grid, a tuned circuit resonating at a frequency within said band and sharply peaked relative to the width of said band, means connecting one point on said tuned circuit to said cathode, a source of direct current power having a negative side connected to another point on said tuned circuit and a positive side connected to said second grid as well as to said anode, means for producing a rectified potential proportional to the potential across said tuned circuit and for controlling the potential of the third grid relative to the cathode with said rectified potential, the positive side of said rectified potential being connected to said third grid, said electron discharge device being normally biased to cut off but being rendered conductive when the potential of the last-named means builds up, and a sound producing means in series with said anode.

2. In a television receiver, an input circuit for passing a band of frequencies wide enough to include both the video and sound modulations, said circuit including tuning means for varying the frequency of reception, a detector coupled to the output of said circuit, means coupled to the output of said detector for producing a picture conforming to the video modulation detected, means for separating the audio modulations in the output of said detector and for amplifying the same, the last-named means including an audio amplifier discharge device having grid means, means connecting said grid means to said input circuit whereby amplified signals of frequencies in said band will appear in the output of said discharge device, a tuned circuit in the output circuit of said discharge device, said tuned circuit being tuned to a frequency within said band and being sharply peaked as compared to the width of said band, said grid means being normally biased to cut off, control means responsive to the potential across said tuned circuit for overcoming the cut-off bias on the grid means when the potential across said tuned circuit increases, and sound producing means energized by the output circuit of the discharge device.

3. In a television receiver having means responsive to a received composite signal for producing an audio signal and means responsive to said received signal for producing a separate I. F. picture carrier, a single amplifier, means applying both said audio signal and said I. F. picture carrier to an input of said single amplifier whereby said amplifier acts in common to amplify both said audio signal and said I. F. picture carrier, sound producing means coupled to said amplifier and responsive to said amplified audio signal, a tuned circuit coupled to an output of said amplifier, said circuit being sharply tuned to a preselected I. F. picture carrier frequency, means for tuning said receiver to vary the frequency of said I. F. picture carrier applied to said amplifier thereby to vary the potential in said tuned circuit, rectifier means coupled to said tuned circuit, and tuning indicator means responsive to the rectified output of said tuned circuit.

4. The combination of claim 3 wherein said tuning indicator means comprises means giving a visual tuning indication.

5. The combination of claim 3 wherein said tuning indicator means comprises means giving an audible tuning indication.

6. The combination of claim 3 wherein said single amplifier comprises a grid controlled amplifier tube, said tuned circuit being coupled to the cathode of said tube, said audio signal and I. F. carrier being applied to the control grid of said tube, said sound producing means comprising a speaker coupled to the anode of said tube and responsive to the audio signal level appearing at said anode.

7. The combination of claim 3 wherein said single amplifier comprises an amplifier tube having at least first and second grid elements, said audio and I. F. carrier signals being applied to one of said grid elements, said rectifier means coupling potentials from said tuned circuit to the other of said grid elements.

8. In a tunable television receiver having means responsive to a received composite signal for producing an audio frequency signal and means responsive to said received signal for producing a separate radio frequency picture signal, a grid controlled audio amplifier tube, means applying both said audio and radio frequency signals to the control grid of said tube whereby said tube amplifies both said audio and radio frequency signals, a circuit tuned to said separate radio frequency signal and coupled to an output electrode of said amplifier tube whereby said radio frequency signal varies during tuning of said receiver and the potential in said tuned circuit sharply increases when said receiver is tuned to the selected composite signal, biasing means for normally suppressing substantially all audio output from said tube, means cooperating with said biasing means and responsive to an increase in the level of potential in said tuned circuit for increasing appreciably the audio signal output of said amplifier tube, and means responsive to said increase in level of potential in said tuned circuit for giving a tuning indication during tuning of said receiver.

9. The combination of claim 8 wherein said tuned circuit is in the cathode circuit of said amplifier tube whereby said audio amplifier tube acts as a cathode follower to said radio frequency signal.

10. In a tunable television receiver having means responsive to a received composite signal for producing an audio frequency signal and means responsive to said received signal for producing a separate intermediate frequency picture carrier, a grid controlled vacuum tube, means coupling both said audio and intermediate frequency picture carrier signals to said vacuum tube whereby the same said vacuum tube amplifies both said signals, sound producing means coupled to said vacuum tube and responsive to said amplified audio signal, and a frequency selective tuning indicator coupled to said vacuum tube and responsive to the magnitude of said amplified intermediate frequency picture carrier signal.

References Cited in the file of this patent

UNITED STATES PATENTS

| | | |
|---|---|---|
| 2,023,458 | Yolles | Dec. 10, 1935 |
| 2,137,123 | Lewis | Nov. 15, 1938 |
| 2,335,701 | Bradley | Aug. 15, 1944 |
| 2,431,577 | Moore | Nov. 25, 1947 |
| 2,773,119 | Parker | Dec. 9, 1956 |

FOREIGN PATENTS

| | | |
|---|---|---|
| 621,465 | Germany | Oct. 17, 1935 |

OTHER REFERENCES

Rider's Television Manual, vol. 4, copyrighted Nov. 25, 1949; Capehart-Farnsworth TV, page 4—15, DuMont TV, page 4—7.